United States Patent Office 3,714,198
Patented Jan. 30, 1973

3,714,198
POLYGLYCIDYL ESTERS
Karl Metzger, Aesch, and Karl Scheuzger, Basel, Switzerland, assignors to Ciba-Geigy AG, Basel, Switzerland
No Drawing. Continuation-in-part of applications Ser. No. 656,363, July 27, 1967, now abandoned, and Ser. No. 793,876, Jan. 24, 1969, the latter being a continuation-in-part of application Ser. No. 656,363. This application Jan. 18, 1971, Ser. No. 107,497
Claims priority, application Switzerland, July 29, 1966, 10,997/66
Int. Cl. C07d 1/18
U.S. Cl. 260—348 A       1 Claim

ABSTRACT OF THE DISCLOSURE

New polyglycidyl esters of the formula

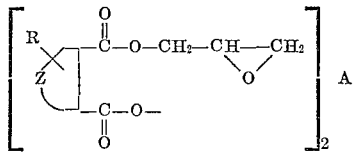

where Z stands for an at least partially hydrogenated benzene ring in which the two esterified carboxyl groups are linked with vicinal cyclic carbon atoms, R for a hydrogen atom or a methyl group and A for a divalent cycloaliphatic group.

CROSS-REFERENCES TO RELATED APPLICATIONS

This application is a continuation-in-part application of our application Ser. No. 656,363, filed July 27, 1967, now abandoned, and of our pending application Ser. No. 793,876, filed Jan. 24, 1969, now abandoned, which in turn is a continuation-in-part application of our application Ser. No. 656,363, filed July 27, 1967, now abandoned.

Processes for the manufacture of polyglycidyl esters of partial esters from 1 mol of a polyalcohol or glycol, such as ethyleneglycol, and $n$ or 2 mols respectively of a dicarboxylic acid anhydride have been described in the patent literature (cf. British specification 884,033 and German Auslegeschriften 1,165,030 and 1,168,907). The partial esters may be manufactured in a separate stage and then converted with epichlorohydrin into the polyglycidyl esters (cf. German Auslegeschrift 1,165,030) or else the partial esters are formed on glycidylation in situ by reacting a mixture of epichlorohydrin, dicarboxylic acid anhydride and polyalcohol or polyglycol. On an experimental basis only the glycidyl esters of those partial esters which are derived either from aromatic dicarboxylic acids, such as phthalic acid, or from aliphatic dicarboxylic acids, such as succinic anhydride, have been manufactured. While the polyglycidyl esters of partial esters from phthalic acid and polyalcohols or polyglycols have in the cured state good mechanical properties, their electrical properties, especially the stability towards leakage currents and the arc stability are completely unsatisfactory for some special uses in the electrical sector, for example for load shedding switches and overhead line insulators.

The polyglycidyl esters of the partial esters from aliphatic dicarboxylic acids and polyalcohols or polyglycols, on the other hand, have as a rule poorer mechanical properties. In the description to British specification 884,033 there has moreover been named as starting material for the glycidylation, the partial ester from a glycol and 2 mols of a hydroaromatic polycarboxylic acid anhydride, namely endomethylene-tetrahydrophthalic anhydride. The resulting diglycidyl esters display in the cured state a stability towards leakage currents and electric arcs similar to that of the corresponding diglycidyl esters derived from aromatic dicarboxylic acids, such as phthalic acid.

Surprisingly, it has now been found that the polyglycidyl esters of partial esters from polyalcohols and hexahydrophthalic acid or tetrahydrophthalic acid or their methylhomologues possess in the cured state not only outstandingly good mechanical properties but also very good electrical properties, especially excellent stability to electric arcs and leakage currents.

The polyglycidyl esters are of the general formula (I) 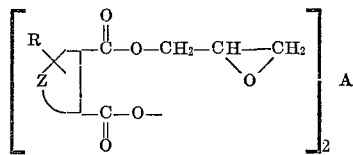

in which Z represents an at least partially hydrogenated benzene ring in which the two esterified carboxyl groups are linked with vicinal cyclic carbon atoms, R stands for a hydrogen atom or a methyl group, A for the residue of a polyalcohol, containing at least $n$ alcoholic hydroxyl groups, left on removal of $n$ hydroxyl groups, and $n$ is a whole number, at least 2, preferably from 2 to 6.

The present invention provides new diglycidyl esters of the formula (II) 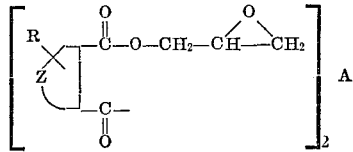

where Z represents an at least partially hydrogenated benzene ring, preferably a hexahydrobenzene or tetrahydrobenzene ring, in which the two esterified carboxyl groups are linked with vicinal carbon atoms, R represents hydrogen or a methyl group, and A represents a divalent cycloaliphatic group, preferably the group of the formula (III) 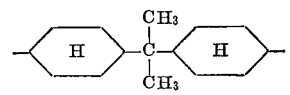

The diglycidyl ester according to claim 1 of the formula (IV) 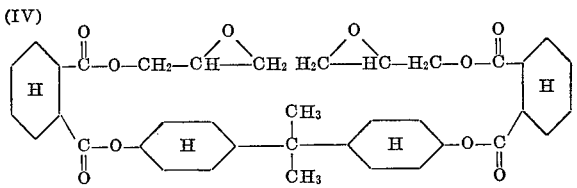

is preferred.

Among the polyglycidyl esters of this invention the compounds in which the n-valent residue A still contains at least one free hydroxy group, in fact preferably a secondary hydroxy group, are distinguished by particularly good mechanical properties and heat distortion properties. Of these preferred polyglycidyl esters containing hydroxyl groups these compounds are specially accessible which correspond to the general formula (V) 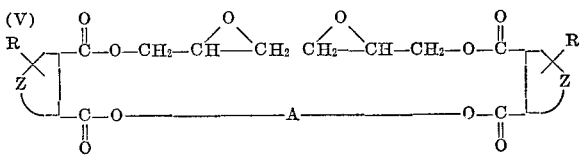

where A, Z and R have the same meaning as in Formula II.

The new polyglycidyl esters are obtained when a partial ester of the formula (VI)

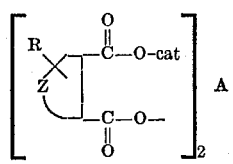

where Z, R and A have the same meanings as in Formula II "Cat" is a cation, preferably hydrogen or an alkali metal, is reacted in known manner in one stage or several stages with an epihalohydrin, accompanied by elimination of "Cat-Hal," where Hal is the halogen atom of the epihalohydrin.

The starting materials used in the manufacture of the preferred diglycidyl esters of the Formula V are partial esters of the formula (VII)

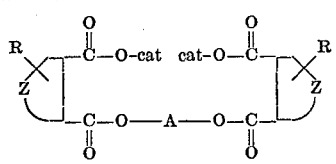

in which A, Z, R and cat have the same meanings as in Formula VI.

The process may be performed, for example, in the following manner: An alkali metal salt of the partial ester, for example the disodium salt of the semi-ester from 1 mol of a glycol and 2 mols of hexahydrophthalic anhydride is reacted at an elevated temperature with an excess of an epihalohydrin, such as epichlorohydrin, then the precipitated inorganic salt is filtered off and the excess epichlorohydrin is distilled off.

Furthermore, the partial ester in the form of the free acid may be reacted in a single stage with an excess of the epihalohydrin, that is to say a rule in an amount of more than 2 mols for every free carboxyl group, in the presence of a suitable catalyst, for example a tertiary amine, quaternary ammonium salt or ion exchange resin, to arrive at the glycidyl ester. In this reaction the epihalohydrin is added on to the free carboxyl groups of the semi-ester and the corresponding halohydrin-ester is primarily formed. The excess epihalohydrin then eliminates hydrogen halide from the halohydrin ester groups and glycidyl ester groups and an equivalent quantity of glycerol dihalohydrin are formed. On completion of the reaction, the latter is distilled off together with epihalohydrin and can can be regenerated to epihalohydrin by treatment with strong alkalies. Such a single-stage catalytic process has been described, for eyample, in German Auslegeschrift 1,065,030. The process has the disadvantage that it gives rise to relatively impure products which, owing to their rather considerable content of halohydrin esters, have a relatively low content of epoxide oxygen and a high content of halogen or chlorine respectively.

According to a preferred process the new glycidyl esters of the Formula II of this invention are obtained when epihalohydrin, preferably epichlorohydrin, in the presence of a catalyst, preferably a tertiary amine or a quaternary ammonium base or a quaternary ammonium salt, is reacted with a partial ester of the Formula VI and the resulting product containing halohydrin groups is treated with agents that split off hydrogen halide.

Catalysts particularly suitable for the addition of epichlorohydrin are tertiary amines, such as triethylamine, tri-n-propylamine, benzyldimethylamine, N,N'-dimethylaniline and triethanolamine; quaternary ammonium bases such as benzyl trimethyl ammonium hydroxide; quaternary ammonium salts such as tetramethyl ammonium chloride, benzyl trimethyl ammonium chloride, benzyl trimethyl ammonium acetate, methyltriethyl ammonium chloride; furthermore ion exchange resins containing tertiary or quaternary amino groups.

Further suitable catalysts are lower thioethers and sulphonium salts or compounds which react with epihalohydrins to form thioethers or sulphonium compounds, such as hydrogen sulphide, sodium sulphide or mercaptans. As such thioethers and sulphonium salts respectively there may be mentioned: Diethylsulphide, β-hydroxyethylethylsulphide, β-hydroxypropylethylsulphide, ω-hydroxy-tetramethylene-ethylsulphide, thiodiglycol, mono-β-cyanoethyl-thioglycol ether, dibenzylsulphide, benzylethylsulphide, benzylbutylsulphide, trimethylsulphonium iodide, tris (β-hydroxyethyl)sulphonium chloride, dibenzylmethyl-sulphoniumbromide, 2,3-epoxypropyl - methylethylsulphonium iodide, dodecylmethylsulphide and dithian.

The dehydrohalogenation is generally carried out with the use of strong alkalies, such as anhydrous sodium hydroxide or aqueous sodium hydroxide solution, though other strong alkaline reagents, such as potassium hydroxide, barium hydroxide, calcium hydroxide, sodium carbonate or potassium carbonate are equally suitable.

The dehydrohalogenation itself may be carried out in several stages: At first a treatment with solid sodium or potassium hydroxide may be performed at an elevated temperature, followed by distillative removal of the excess epihalohydrin and heating in an inert solvent with a shortfall of concentrated alkali metal hydroxide solution, for example sodium hydroxide solution of 50% strength, as described in German Auslegeschrift 1,211,177.

As epihalohydrin there may be used epibromohydrin or above all epichlorohydrin. Good yields are achieved by using an excess of epichlorohydrin, namely preferably 5 to 40 mols of epichlorohydrin for every carboxyl group. During the first reaction, before alkali is added, partial epoxidation of the dichlorohydrin ester of the partial ester VI occurs. The epichlorohydrin, which acts as an acceptor for hydrogen chloride, has then been partially converted into glycerol dichlorohydrin.

The partial esters of the Formula VI used as starting compounds are accessible in known manner by reacting $n$ mols of a dicarboxylic acid anhydride of the formula (VIII)

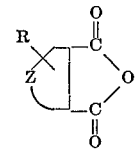

with 1 mol of a cycloaliphatic dialcohol.

As dicarboxylic acid anhydrides of the Formula VIII there may be mentioned the anhydrides of the following acids: Hexahydrophthalic, 4-methylhexahydrophthalic, $\Delta^4$-tetrahydrophthalic, 4 - methyl - $\Delta^4$ - tetrahydrophthalic, and also the isomer mixtures obtained by isomerization of tetrahydrophthalic anhydride in the presence of a suitable catalyst, such as palladium or ruthenium metal (cf. U.S. specification 2,764,597) which mixtures contain predominantly 4-methyl-$\Delta^3$-tetrahydrophthalic, 4-methyl-$\Delta^1$-tetrahydrophthalic and 4-methyl-$\Delta^2$-tetrahydrophthalic anhydride.

As polyalcohols there are suitable saturated or unsaturated dihydric or polyhydric alcohols. The polyalcohols may contain $(n+x)$ alcoholic hydroxyl groups where $n$ has the same meaning as in Formula I and $x$ is either 0 or a small whole number, generally from 1 to 4. In the formation of the partial esters by reacting 1 mol of a polyalcohol with $n$ mol of a dicarboxylic anhydride (VIII) the primary hydroxyl groups generally enter the reaction first. When the starting material used is a polyalcohol that contains more than 2 hydroxyl groups, it is possible to choose the molecular ratio between polyalcohol and dicarboxylic anhydride so that partial esters of the Formula VI are obtained which still contain free hydroxyl groups, in fact as a rule free secondary hydroxyl groups. As mentioned above, such partial esters, which still contain free hydroxyl groups, furnish on glycidylation glycidyl esters having especially good mechanical properties and heat distortion characteristics.

As saturated dihydric and polyhydric alcohols there may be mentioned: Ethyleneglycol, 1,2-propanediol, 1,3-propanediol, glycerol, 1,3-butanediol, 1,4-butanediol, 1,5-pentanediol, 2-methyl-n-pentanediol-2,4, n-hexanediol-2,5, 1,2,4-butanetriol, 2-ethylhexanediol-1,3, 2,4-dihydroxy-2-hydroxymethyl-pentane, 2,4,6-hexanetriol, 1,2,6-hexanetriol 1,1,1-trimethylolethane, 1,1,1-trimethylolpropane, 2,2'-dihydroxy-di-n-propyl ether, diethyleneglycol, triethyleneglycol, polyethyleneglycols, polypropyleneglycols, erythritol, xylitol, arabitol, sorbitol, mannitol, dulcitol, talitol, iditol, adonitrol and pentaerythritol, heptitols, cyclohexanedimethanol - 1,4, 2,2,6,6 - tetramethylolcyclohexanol, cis- and trans-quinitol, hydrated diomethane, polyvinyl alcohol, 1,4-dihydroxy - 5 - chlorocyclohexane; adducts of epoxides, such as ethylene oxide, propylene oxide, epichlorohydrin or styrene oxide with dialcohols and polyalcohols or diphenols or polyphenols; monoesters from fatty acids and polyalcohols containing 3 or 4 hydroxyl groups, such as glycerol or pentaerythritol; monoethers from polyalcohols with 3 or 4 hydroxyl groups, for example diglycerol or adducts from 1 mol of ethylene oxide or propylene oxide and 1 mol of a trihydric alcohol, such as butanetriol, hexanetriol or glycerol.

As unsaturated polyalcohols there may be mentioned, for example, 2-butene-diol-1,4, glycerol monoallyl ether, butane-1,2,4-triol-monoallyl ether, 1,1-bis-(hydroxymethyl)-cyclohexene-3, 1,1 - bis(hydroxymethyl) - 6 - methyl-cyclohexene-3, 1,1-bis(hydroxymethyl) - 4 - chlorocyclohexene-3.

The new polyglycidyl esters of the Formula II obtained according to this invention are as a rule at room temperature thinly liquid to viscid or more rarely low-melting resins. They react with the usual curing agents for epoxy resins so that by addition of such curing agents they can be crosslinked or cured like other polyfunctional epoxy compounds or epoxy resins. As such curing agents both basic and acid compounds come into consideration.

The following have proved suitable: Amines or amides such as aliphatic or aromatic, primary, secondary or tertiary amines, for example p-phenylenediamine, bis-(p-aminophenyl)-methane, ethylenediamine, N,N-diethylethylenediamine, diethylenetriamine, tetra(hydroxyethyl)diethylenetriamine, triethylenetetramine, N,N - dimethylpropylene diamine, Mannich's bases such as tris(dimethylaminomethyl)phenol, dicyandiamide, melamine, cyanuric acid, urea-formaldehyde resins, melamine-formaldehyde resins; polyamides, for example those from aliphatic polyamines and dimerized or trimerized unsaturated fatty acids; polyhydric phenols, for example resorcinol, bis(4-hydroxyphenyl)dimethylamine, phenol-formaldehyde resins, reaction products of aluminium alcoholates or phenolates with compounds of tautomeric reaction of the acetoacetic acid ester type, Friedel-Crafts catalysts, for example AlCl$_3$, SbCl$_5$, SnCl$_4$, ZnCl$_2$, BF$_3$ and their complexes with organic compounds, for example BF$_3$-amine complexes; metal fluoroborates such as zinc fluoborate; phosphoric acid; boroxines such as trimethoxyboroxine; polybasic carboxylic acids and their anhydrides, for example the anhydrides of the following acids: phthalic, tetrahydrophthalic, hexahydrophthalic, methylhexahydrophthalic, endomethylene-tetrahydrophthalic, methyl-endomethylene-tetrahydrophthalic (=methyl nadic anhydride), hexachloro-endomethylene-tetrahydrophthalic, succinic, adipic, maleic, allylsuccinic, dodecenylsuccinic; 7 - allyl-bicyclo(2.2.1)-hept-5-ene-2,3-dicarboxylic acid, pyromellitic acid or mixtures of such anhydrides.

If desired or required, accelerators may be additionally used, such as tertiary amines, their salts or quaternary ammonium compounds, for example tris(dimethylaminomethyl)phenol, benzyldimethylamine or benzyldimethyl ammonium phenate, tin(II) salts of carboxylic acids such as tin(II)octoate or alkali metal alcoholates for example sodium hexylate.

The term "curing" as used in this context signifies the conversion of the above polyglycidyl esters into insoluble and infusible, crosslinked products, as a rule simultaneously with shaping to form shaped products such as castings, mouldings or laminates or flat structures such as lacquer films or cemented products.

If desired, the viscosity of the polyglycidyl esters of the invention may be reduced by addition of active diluents, for example butylglycide, cresylglycide or 3-vinyl-2,4-dioxaspiro(5.5)-9,10-epoxyundecane.

The polyglycidyl esters of this invention may further be incorporated with other curable diepoxy or polyepoxy compounds to act as upgraders. As such products there may be mentioned, for example:

Polyglycidyl ethers of polyhydric alcohols or especially polyhydric phenols such as resorcinol, bis(4-hydroxyphenyl)-dimethylmethane (=bisphenol A) or condensation products of formaldehyde with phenols (novolaks); polyglycidyl esters of polycarboxylic acids, for example phthalic acid; aminopolyepoxides, such as are obtained by dehydrohalogenating the reaction products from epihalohydrin and primary or secondary amines, such as aniline or 4,4'-diaminodiphenylmethane, and alicyclic compounds containing several epoxide groups, such as vinylcyclohexane dioxide, dicyclopentadiene diepoxide, ethyleneglycol bis(3,4-epoxy-tetrahydrodicyclopentadien-8-yl)-ether, 3,4 - epoxy-tetrahydrodicyclopentadienyl-8-glycidyl ether, (3',4'-epoxy-cyclohexylmethyl)-3,4-epoxy-cyclohexanecarboxylate, (3',4' - epoxy-6'-methyl-cyclohexylmethyl)-3,4-epoxy - 6 - methyl - cyclohexanecarboxylate, bis(cyclopentyl)-ether diepoxide or 3-(3',4'-epoxy-cyclohexyl) - 2,4 - dioxa-spiro(5.5)-9,10-epoxy-undecane.

Accordingly, the present invention includes also curable mixtures which contain the polyglycidyl esters (I) of this invention, if desired in admixture with other diepoxy or polyepoxy compounds, and also curing agents for epoxy resins, for example polyamines or anhydrides of polycarboxylic acids.

The polyglycidyl esters of this invention and their mixtures with other polyepoxy compounds and/or curing agents may be admixed at any stage prior to their curing with fillers, plasticizers, pigments, dyestuffs, flame-inhibitors and/or mould lubricants. Suitable extenders and fillers are, for example, asphalt, bitumen, glass fibres, cellulose, mica, quartz meal, aluminium hydroxide, gypsum, kaolin, ground dolomite, colloidal silica having a large specific surface (Aerosil) or metal powders, such as aluminium powder.

The curable mixtures may be used in the unfilled or filled state, if desired in the form of solutions or emulsions, as textile adjuvants, coating agents, laminating resins, paints, lacquers, dipping resins, casting resins, moulding compositions, brushing compounds and pore fillers, floorings, potting and insulating compounds for the electrical industry, adhesives and also in the manufacture of such products.

Parts and percentages in the following examples are by weight. The relationship between parts by weight and parts by volume is the same as that between the kilogram and the litre.

EXAMPLE 1

Diglycidyl ester of the reaction product from 1 mol of glycerol and 2 mols of hexahydrophthalic anhydride (a) Manufacturing the semi-ester.—154 parts (1 mol) of hexahydrophthalic anhydride are stirred and melted in a reactor and then heated to 110° C. 46 parts (0.5 mol) of glycerol are dropped in within 10 minutes. After a short induction period an exothermic reaction sets in so that the temperature rises to about 140° C. After one hour's reaction at a temperature of at least 100° C. a specimen is titrated to measure its acid content. Titration revealed 1.02 equivalents (theory: 1.00 equivalent)

of free carboxyl groups which corresponds to an almost quantitative formation of semi-ester. The difference is attributable to the hydrolysis of anhydride.

(b) Glycidylation.—The semi-ester is mixed in the same reactor with 925 parts (10 mols) of epichlorohydrin and 1.5 parts of benzyl triethyl ammonium chloride and heated to 105° C. A weak exothermic reaction sets in and the temperature rises to about 115° C. After one hour's reaction at 100° C. titration reveals in the reaction mixture an epoxide content of 8.05 epoxide equivalents per kg. (theory 7.99), whereupon 96 parts (1.2 mols=20% excess) of sodium hydroxide solution of 50% strength are dropped in. The water introduced and the water of reaction are removed from the reaction mixture as an azeotrope with epichlorohydrin, the water is separated and the epichlorohydrin returned to the flask. The speed of introduction depends on the speed at which the water can be removed from the reaction mixture at 100° C., the boiling point of the azeotrope. The time taken is about 1 hour. After the dropwise addition the last remnants of water are removed by heating the reaction mixture as rapidly as possible to 105° C. and then cooling it. If it is allowed to react longer, the chlorine content rises and the epoxide yield is reduced. The precipitated sodium chloride is filtered off and epichlorohydrin distilled off under vacuum. The residue is dissolved in 700 to 1000 parts by volume of an organic solvent (for example benzene or ethyl acetate), extracted with 150 parts of aqueous sodium hydroxide solution of 5% strength with addition of ice, then agitated with 150 parts of monosodium phosphate solution (140 g./litre), then washed with 2× 100 parts of water and the solvent is distilled off under vacuum. After removal of the last traces of solvent under a high vacuum, there are obtained 243 parts (=95% mass yield) of a yellow, viscous (about 100,000 centipoises at 25° C.) liquid resin which reveals the following analytical data:

Epoxide content: 3.70 epoxide equivalents per kg. (=95% of theory)
Hydroxyl content: 2.0 OH/kg. (theory: 1.95 OH/kg.)
Chlorine content: 1.3%.

The product consists predominantly of the diglycidyl ester of the formula

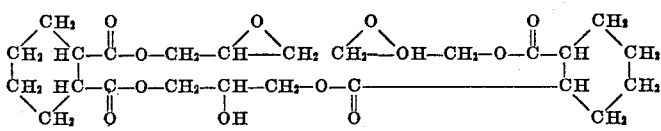

EXAMPLE 2

The partial ester prepared as described in Example 1 from 154 parts (1 mol) of hexahydrophthalic anhydride and 67 parts (0.5 mol) of hexanetriol-1,2,6- yielded on glycidylation (as described in Example 1) 256 parts (=92.5% of theory) of a bright, liquid resin which revealed the following analytical data:

Epoxide content: 3.35 epoxide equivalents per kg. (=92.6% of theory)
Hydroxyl content: 1.36 OH/kg. (theory: 1.8 OH/kg.)
Chlorine content: 1.2%.

The product consists predominantly of the diglycidyl ester of the formula

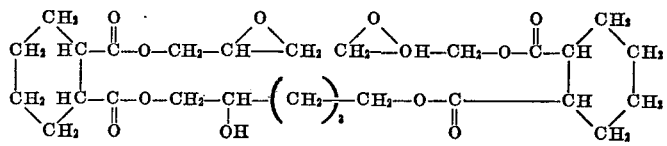

EXAMPLE 3

The partial ester prepared as described in Example 1 from 616 parts (4 mols) of hexahydrophthalic anhydride and 220 parts (1 mol) of 2,2,6,6-tetramethylolcyclohexanol [manufactured according to Org. Synth. 31, page 101 (1951)] yielded on glycidylation (as described in Example 1) 252 parts (=95% of theory) of a resin which was solid at room temperature and revealed the following analytical data:

Epoxide content: 3.23 equivalents per kg. (=85% of theory)
Hydroxyl content: 1.43 OH/kg. (theory: 0.93 OH/kg.)
Chlorine content: 1.1%.

The product consists predominantly of the tetraglycidyl ester of the formula

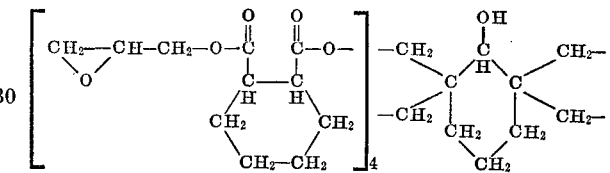

EXAMPLE 4

The partial ester prepared as described in Example 1 from 168 parts (1 mol) of 4-methyl-hexahydrophthalic anhydride and 46 parts (0.5 mol) of glycerol yielded after glycidylation (as in Example 1) 270 parts (=100% of theory) of a bright, liquid resin which revealed the following analytical data:

Epoxide content: 3.33 equivalents per kg. (=90% of theory)
Hydroxyl content: 1.87 OH/kg. (theory: 1.85 OH/kg.)
Chlorine content: 1.5%.

The product consists predominantly of the diglycidyl ester of the formula

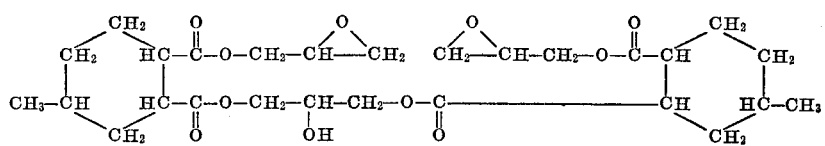

EXAMPLE 5

The partial ester prepared as in Example 1 from 152 parts (1 mol) of Δ⁴-tetrahydrophthalic anhydride and 46 parts (0.5 mol) of glycerol yielded on glycidylation (as in Example 1) 248 parts (=97.8% of theory) of a yellow, liquid resin which revealed the following analytical data:

Epoxide content: 3.61 equivalents per kg. (=91.6% of theory)
Hydroxyl content: 2.16 OH/kg. (theory: 1.96 OH/kg.)
Chlorine content: 1.25%.

The product consists predominantly of the diglycidyl ester of the formula

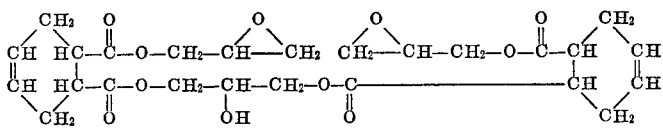

The partial ester prepared as in Example 1 from 166 parts (1 mol) of 4-methyl-Δ⁴-tetrahydrophthalic anhydride and 46 parts (0.5 mol) of glycerol yielded on glycidylation (as in Example 1) 266 parts (=99% of theory) of a yellow liquid resin which revealed the following analytical data:

Epoxide content: 3.41 equivalents per kg. (=91% of theory)
Hydroxyl content: 1.97 OH/kg. (theory: 1.86 OH/kg.)
Chlorine content: 1.45%.

The product consists predominantly of the diglycidyl ester of the formula

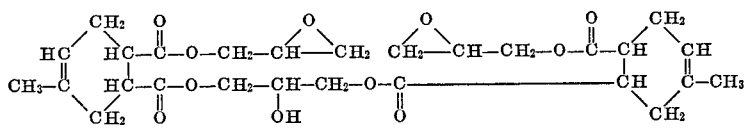

EXAMPLE 7

Diglycidyl ester of the reaction product from 1 mol of ethyleneglycol and 2 mols of hexahydrophthalic anhydride (a) Manufacturing the semi-ester.—While stirring 154 parts (1 mol) of hexahydrophthalic anhydride at 100° C. they are reacted with 31 parts (0.5 mol) of ethyleneglycol. When the exothermic reaction has subsided, the reaction mixture is maintained at 100° C. by heating. After 45 minutes' reaction titration reveals 1.025 equivalents (theory: 1.00 equivalents) of free carboxyl groups, corresponding to an almost quantitative formation of the semi-ester.

(b) Glycidylation.—The semi-ester is mixed with 925 parts (10 mols) of epichlorohydrin and 1.5 parts of benzyl triethyl ammonium chloride and the mixture is heated to 105° C. When the weakly exothermic reaction has subsided, the mixture is heated at 100° C. and after 20 minutes the drop in epoxide content of the mixture is checked. It was possible to identify a residual content of 8.19 epoxide equivalents per kg. (theory: 8.10 epoxide equivalents per kg.). Dehydrohalogenation and working up were performed exactly as described in Example 1.

Yield: 238 parts (=98.5% of the theoretical) of a yellow, thinly liquid resin containing 3.85 epoxide equivalents per kg. (=92.5% of theory) and 1.7% of chlorine.

The product consists predominantly of the diglycidyl ester of the formula

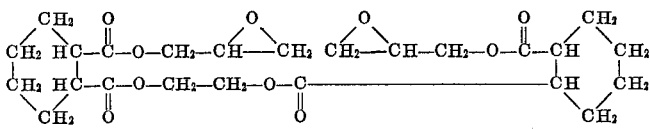

EXAMPLE 8

The partial ester prepared as described in Example 7 from 154 parts (1 mol) of hexahydrophthalic anhydride and 45 parts (0.5 mol) of butanediol-1,4 yielded on glycidylation (as described in Example 7) 247 parts (=97% of theory) of a yellowish, thinly liquid resin which revealed the following analytical data:

Epoxide content: 3.7 equivalents per kg. (=94.5% of theory)
Chlorine content: 0.95%.

The product consists predominantly of the diglycidyl ester of the formula

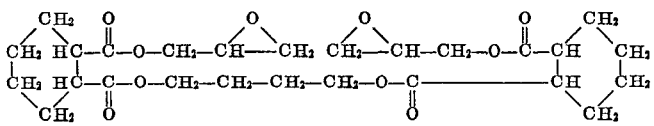

EXAMPLE 9

The partial ester prepared as described in Example 7 from 154 parts (1 mol) of hexahydrophthalic anhydride and 59 parts (0.5 mol) of hexanediol-1,6 yielded on glycidylation (as in Example 7) 260 parts (=97% of theory) of a yellow, thinly liquid resin which revealed the following analytical data:

Epoxide content: 3.52 equivalents per kg. (=94.5% of theory)
Chlorine content: 0.74%.

The product consists predominantly of the diglycidyl ester of the formula

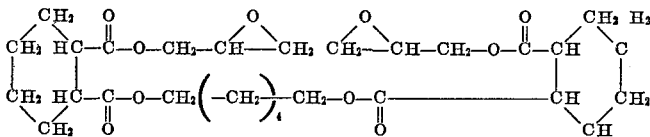

EXAMPLE 10

The partial ester prepared as in Example 7 from 154 parts (1 mol) of hexahydrophthalic anhydride and 75 parts of polypropyleneglycol 150 (mean molecular weight 150) yielded on glycidylation (as in Example 7) 247 parts (=86.5% of theory) of a yellowish, thinly liquid resin which revealed the following analytical data:

Epoxide content: 3.16 equivalents per kg. (=90% of theory)
Chlorine content: 1.45%.

The product consists predominantly of the diglycidyl ester of the formula

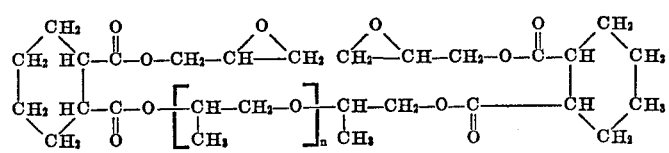

($n$=about 1–2).

EXAMPLE 11

The partial ester prepared as in Example 7 from 154 parts (1 mol) of hexahydrophthalic anhydride and 72 parts (0.5 mol) of cyclohexanedimethanol-1,4 yielded on glycidylation (as in Example 1) 270 parts (=96% of theory) of a bright, liquid resin which revealed the following analytical data:

Epoxide content: 3.46 equivalents per kg. (=98% of theory)
Chlorine content: 0.55%.

The product consists predominantly of the diglycidyl ester of the formula

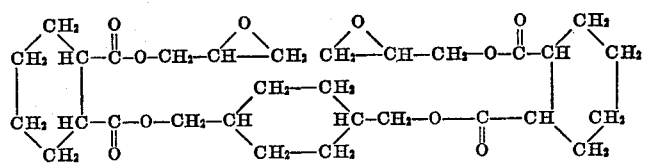

EXAMPLE 12

The partial ester prepared as in Example 7 from 154 parts (1 mol) of hexahydrophthalic anhydride and 45 parts (0.33 mol) of 1,1,1-trimethylolpropane yielded on glycidylation (as in Example 1) 251 parts (=99.5% of theory) of a yellow, viscous-liquid resin which revealed the following analytical data:

Epoxide content: 3.31 equivalents per kg. (=84.5% of theory)
Hydroxyl content: 0.4 OH/kg.
Chlorine content: 2.15%.

The product consists predominantly of the triglycidyl ester of the formula

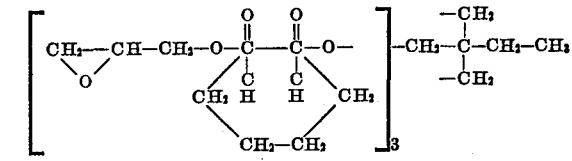

EXAMPLE 13

In this example it was attempted to react all three hydroxyl groups of glycerol in the manufacture of the semi-ester. The partial ester prepared as in Example 7 from 231 parts (1.5 mols) of hexahydrophthalic anhydride and 46 parts (0.5 mol) of glycerol yielded on glycidylation (as in Example 7) 362 parts (=100.5% of theory) of a viscous-liquid, pale yellow resin which revealed the following analytical data:

Epoxide content: 3.33 equivalent per kg. (=80% of theory)
Hydroxyl content: 1.15 OH/kg.
Chlorine content: 2.9%.

A considerable share of the product consists of the triglycidyl ester of the formula

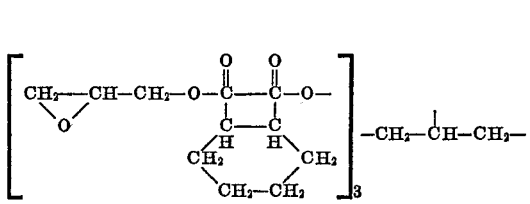

EXAMPLE 14

The partial ester prepared as in Example 7 from 308 parts (2 mols) of hexahydrophthalic anhydride and 68 parts (0.5 mol) of pentaerythritol yielded on glycidylation (as in Example 1) 476 parts (=97.5% of theory) of a pale yellow, highly viscous resin which revealed the following analytical data:

Epoxide content: 3.61 equivalents per kg. (=88% of theory)
Hydroxyl content: 0.75 OH/kg.
Chlorine content: 1.55%.

The product consists predominantly of the tetraglycidyl ester of the formula

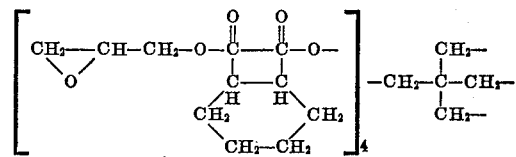

EXAMPLE 15

The partial ester prepared as in Example 7 from 154 parts (1 mol) of hexahydrophthalic anhydride and 30.3 parts (0.166 mol) of D-sorbitol yielded on glycidylation (according to Example 1) 255 parts (=106% of theory) of a brownish yellow, highly viscous resin which revealed the following analytical data:

Epoxide content: 3.35 equivalents/kg. (=80.6% of theory)
Hydroxyl content: 1.43 OH/kg.
Chlorine content: 3.18%

The product consists predominantly of the hexaglycidyl ester of the formula

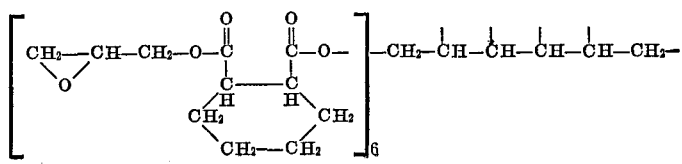

EXAMPLE 16

Each of the polyglycidyl esters prepared in Examples 1 to 15 was mixed with 0.95 mol of hexahydrophthalic anhydride for every epoxide equivalent with heating to form a homogeneous mass and cast in siliconized aluminium tubes. Furthermore to those casting resin specimens whose molecule contains no hydroxyl groups were admixed with 2 parts of benzyldimethylamine for every kg. of epoxy resin as accelerator (polyglycidyl esters of Examples 7 to 14) to ensure good curing right through. The polyglycidyl ester of Example 15 (from D-sorbitol) contained so many shares of by-products containing free hydroxyl groups (1.4 OH/kg.) that it was not necessary to add an accelerator. Each casting resin specimen was cured for 4 hours at 80° C., then for 4 hours at 120° C. and finally for 14 hours at 140° C. Of each cured casting the following properties were measured:

Heat distortion point according to Martens (DIN) in ° C.

Deflection in mm., measured by the bending test according to VSM (test bar 60 x 10 x 4 mm.)

Flexural strength according to VSM, in cm. kg./cm.$^2$

Impact flexural strength according to VSM, in cm. kg./cm.$^2$

The properties of the cured castings are shown in the following table:

(50%) is added for the dehydrohalogenation. Over the course of approximately 75 minutes, 5.66 parts of sodium hydroxide solution (50%) are run in continuously at 54–56° C. Simultaneously, epichlorohydrin and water are distilled off azeotropically under a partial vacuum of 80–60 mm. Hg (initially 80 mm. Hg, towards the end 60 mm. Hg). After completed addition of the sodium hydroxide solution, further distillation is carried out for approximately 10 minutes until the reaction mixture is anhydrous. The reaction mixture is subsequently cooled to ambient temperature and centrifuged with 0.9 part of "Hyflosupercel." The centrifugate is concentrated in a purified vessel, initially at an internal temperature of approximately 60–65° C., and a partial vacuum of approximately 150 mm. Hg.

As the distillation becomes slower, the pressure is lowered and the internal temperature increased to 100° C. After the excess epichlorohydrin has been distilled off, the residue is finally dried for 30 minutes at 120° C. and approximately 15 mm. Hg. The product is a clear, brown resin possessing the following properties:

Viscosity at 25° C. _____ 42,000 cp.
Epoxide content _____ 3.7 equivalents/kg.
Total chlorine content _____ 0.6%.
Density at 25° C. _____ 1.15.

|  | Polyglycidyl ester resin, epoxide equivalents/kg. | Properties of the cured castings ||||
|---|---|---|---|---|---|
|  |  | Martens, ° C. | Deflection in mm. | Flexural strength in kg./mm.$^2$ | Impact flexural strength in cmkg./cm. |
| Example: |  |  |  |  |  |
| 1 | 3.70 | 80 | 11.7 | 15.0 | 12.8 |
| 2 | 3.35 | 70 | 15.3 | 12.9 | 7.6 |
| 3 | 3.23 | 119 | 5.4 | 12.4 | 4.3 |
| 4 | 3.33 | 72 | 4.3 | 9.1 | 8.1 |
| 5 | 3.61 | 70 | 11.4 | 13.4 | 8.1 |
| 6 | 3.41 | 70 | 8.2 | 12.1 | 11.9 |
| 7 | 3.85 | 43 | 4.7 | 9.7 | 8.6 |
| 8 | 3.70 | 47 | 4.8 | 9.1 | 8.4 |
| 9 | 3.52 | 46 | 18.3 | 10.5 | 9.4 |
| 10 | 3.16 | 47 | 15 | 10.7 | 5.6 |
| 11 | 3.46 | 64 | 15.0 | 11.6 | 6.5 |
| 12 | 3.31 | 77 | 7.3 | 11.6 | 8.0 |
| 13 | 3.33 | 71 | 5.7 | 9.2 | 5.5 |
| 14 | 3.61 | 99 | 5.5 | 11.5 | 5.3 |
| 15 | 3.35 | 97 | 11.0 | 14.3 | 5.2 |

It has the following formula:

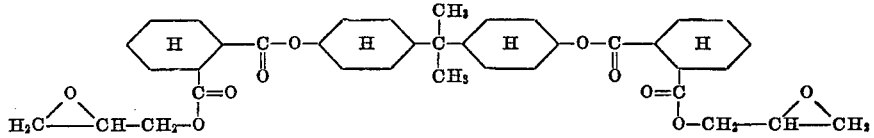

EXAMPLE 17

7.20 parts of 2,2-bis-(4'-hydroxycyclohexyl)-propane and 9.25 parts of hexahydrophthalic anhydride are introduced into a 60-1 agitator vessel while running in nitrogen and heated to 135° C. After the mixture has been stirred at this temperature for 2 hours, it is cooled to 120° C. and stirred for a further 2 hours. Thereafter the mixture is cooled to 115° C. and 33.30 parts of epichlorohydrin are added. After all the ingredients have dissolved, the solution is cooled to 55° C., the flow of nitrogen is turned off, and 0.35 part of tetramethylammonium chloride (50%) is added. The reaction mixture is concentrated by azeotropic distillation under a partial vacuum to approximately 85–95° C. The heating must be carried out with care above 80° C. in order that the vigorously exothermic reaction can be collected. The further addition takes place at 95–100° C. Cooling to an internal temperature of 55° C. is now effected as rapidly as possible. A further 0.20 part of tetramethylammonium chloride

What is claimed is:

1. The diglycidyl ester of the formula

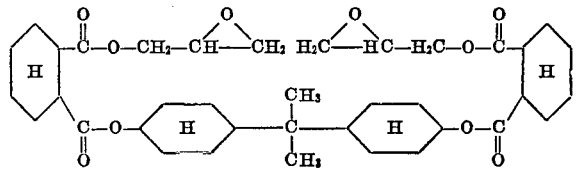

References Cited

FOREIGN PATENTS 1,245,369  7/1967  Germany _____ 260—348 A
473,798   7/1969  Switzerland _____ 260—348 A NORMA S. MILESTONE, Primary Examiner U.S. Cl. X.R.

260—468 R, 2 EP